(12) United States Patent
Caubert (10) Patent No.: US 10,126,800 B2
(45) Date of Patent: Nov. 13, 2018

(54) ELECTRONIC ARCHITECTURE FOR CONTROLLING A DC/AC VOLTAGE CONVERTER

(71) Applicant: Valeo Systemes de Controle Moteur, Cergy Saint Christophe (FR)

(72) Inventor: Guillaume Caubert, Paris (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 181 days.

(21) Appl. No.: 14/786,311

(22) PCT Filed: Apr. 24, 2014

(86) PCT No.: PCT/FR2014/050998
§ 371 (c)(1),
(2) Date: Oct. 22, 2015

(87) PCT Pub. No.: WO2014/174221
PCT Pub. Date: Oct. 30, 2014

(65) Prior Publication Data
US 2016/0077566 A1    Mar. 17, 2016

(30) Foreign Application Priority Data

Apr. 26, 2013  (FR) ..................... 13 53871

(51) Int. Cl.
*G06F 1/28*      (2006.01)
*B60L 11/18*     (2006.01)
(Continued)

(52) U.S. Cl.
CPC ................ *G06F 1/28* (2013.01); *B60L 3/003* (2013.01); *B60L 3/0084* (2013.01); *B60L 7/14* (2013.01);
(Continued)

(58) Field of Classification Search
CPC ... G06F 1/28; G06F 1/30; B60L 3/003; B60L 3/0084; B60L 7/14; B60L 11/005;
(Continued)

(56) References Cited

U.S. PATENT DOCUMENTS

| 2009/0302792 A1* | 12/2009 | Osada .................. H02P 29/032 318/400.21 |
| 2011/0316462 A1* | 12/2011 | Bouchez .................. B60L 7/10 318/400.29 |
| 2012/0319478 A1 | 12/2012 | Gentchev et al. |

FOREIGN PATENT DOCUMENTS

| EP | 0775384 A1 | 5/1997 |
| EP | 2398141 A2 | 12/2011 |

(Continued)

OTHER PUBLICATIONS

International Search Report issued in PCT/FR2014/050998 dated Feb. 12, 2015 (3 pages).

*Primary Examiner* — Jue Zhang
(74) *Attorney, Agent, or Firm* — Osha Liang LLP (57) ABSTRACT

Electronic architecture (3) for controlling a DC/AC voltage converter (2), said converter (2) comprising a plurality of arms mounted in parallel, each arm comprising two controllable switching cells (21), in series and separated by a mid-point, the arms being paired in H-bridges (20), the architecture (3) comprising: —a main control unit (36), configured to communicate through a potential barrier (61) with a remote control unit (35), and —a plurality of secondary control units (37), each secondary control unit (37) being dedicated to controlling a respective H-bridge (20), and comprising: —a processing unit (40) for processing the information received from the main control unit (36), and —a monitoring unit (41) for monitoring the controllable switching cells (21) of said H-bridge (20), said monitoring unit (41) being configured to modify the state of all or some (Continued)

of said switching cells (21) of said H-bridge (20) at least on the basis of information received from the corresponding processing unit (40).

16 Claims, 2 Drawing Sheets

(51) Int. Cl.
*H02M 7/5387* (2007.01)
*B60L 3/00* (2006.01)
*B60L 7/14* (2006.01)
*B60L 11/00* (2006.01)
*B60L 15/00* (2006.01)
*B60L 15/20* (2006.01)
*G06F 1/30* (2006.01)
*H02M 1/00* (2006.01)

(52) U.S. Cl.
CPC ......... *B60L 11/005* (2013.01); *B60L 11/1803* (2013.01); *B60L 11/1816* (2013.01); *B60L 11/1864* (2013.01); *B60L 15/007* (2013.01); *B60L 15/20* (2013.01); *G06F 1/30* (2013.01); *H02M 7/53873* (2013.01); *B60L 2210/10* (2013.01); *B60L 2210/40* (2013.01); *B60L 2210/42* (2013.01); *B60L 2220/14* (2013.01); *B60L 2240/421* (2013.01); *B60L 2240/425* (2013.01); *B60L 2240/525* (2013.01); *H02M 2001/0012* (2013.01); *Y02T 10/645* (2013.01); *Y02T 10/7005* (2013.01); *Y02T 10/7022* (2013.01); *Y02T 10/7061* (2013.01); *Y02T 10/7072* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y02T 90/16* (2013.01)

(58) Field of Classification Search
CPC .............. B60L 11/1803; B60L 11/1816; B60L 11/1864; B60L 15/007; B60L 15/20; H02M 7/53873
See application file for complete search history.

(56) References Cited

FOREIGN PATENT DOCUMENTS

| EP | 2651023 A1 | 10/2013 |
|---|---|---|
| WO | 2010/057893 A1 | 5/2010 |
| WO | 2012/077187 A1 | 6/2012 |
| WO | 2012/143642 A1 | 10/2012 |

* cited by examiner

ELECTRONIC ARCHITECTURE FOR CONTROLLING A DC/AC VOLTAGE CONVERTER

The present invention relates to an electronic architecture for controlling a d.c./a.c. voltage converter. A converter of this type is described as an "inverter" where it is arranged to transform a d.c. voltage into an a.c. voltage, and as a "rectifier" where it is arranged to transform an a.c. voltage into a d.c. voltage.

This architecture may be fitted to an electric or hybrid vehicle, and is used to control the conversion of a supply voltage delivered by an electric power grid into a d.c. voltage which supplies an electrical energy storage unit, for the purpose of charging the latter. As a variant, the architecture may be used to control the conversion of the d.c. voltage delivered by said electrical energy storage unit into an a.c. voltage to be supplied to the stator of an electric machine for the propulsion of the vehicle, or into an a.c. voltage which is to be fed into the electric power grid.

For an application of this type in a vehicle, it is necessary to ensure that one or more anomalies which might occur in any component involved in the supply of electric power to the electric machine from the electrical energy storage unit when the vehicle is in motion will not jeopardize the safety of vehicle users or of other persons.

In the same way, it is necessary to ensure that one or more anomalies which might occur in any component involved in the charging of the electrical energy storage unit from the electric power grid will likewise not jeopardize the safety of persons in proximity to the vehicle.

Accordingly, there is a need for an electronic architecture for the control of a d.c./a.c. voltage converter which fulfills the above-mentioned safety requirements and, at the same time, is relatively simple and straightforward to deploy.

The invention fulfills this requirement in one of its aspects, by the use of an electronic architecture for the control of a d.c./a.c. voltage converter, said converter comprising a plurality of arms mounted in parallel, each arm comprising two controllable switching cells, in series and separated by a mid-point, the arms being paired in H-bridges, wherein said architecture comprises:
  a main control unit, configured to communicate through a potential barrier with a remote control unit, and
  a plurality of secondary control units, wherein each secondary control unit is dedicated to the control of a respective H-bridge, and comprises:
  a processing unit for the processing of information received from the main control unit, and
  a monitoring unit for the monitoring of the controllable switching cells of said H-bridge, wherein said monitoring unit is configured to modify the state of all or some of said switching cells of said H-bridge, at least on the basis of information received from the corresponding processing unit.

By virtue of the architecture described above, an anomaly affecting the main control unit does not affect the control of the switching cells of the H-bridges, as secondary control units are provided for each H-bridge. In the same way, an anomaly affecting a secondary control unit does not prevent the control of at least the switching cells of the H-bridges to which the other secondary control units are dedicated. Accordingly, the latter may control their respective H-bridge, for example on the basis of information transmitted from the main control unit.

Accordingly, the architecture described above is more secure.

Each of the above-mentioned units forms, for example, a separate physical component, i.e. all the secondary control units may be physically separate from each other, and also separate from the main control unit.

The monitoring units are commonly described as "drivers".

The main control unit may be configured for the transmission to each secondary control unit of information originating from the remote control unit. In this case, the main control unit is interposed between the secondary control units and the remote control unit.

According to one example of embodiment of the invention, the remote control unit, the main control unit and the processing units of the secondary control units comprise integrated circuits.

Said integrated circuits may be digital or analog integrated circuits.

According to one specific but nonlimiting example of embodiment of the invention, the remote control unit comprises at least one microcontroller, the main control unit is a first programmable logic circuit (FPGA, or field-programmable gate array), and each processing unit of a secondary control unit is a second programmable logic circuit.

Each secondary control unit may comprise a dedicated electrical energy source and a dedicated clock. Each secondary control unit may also comprise a module for the management of the power on reset function. This module ensures that resetting is interrupted, once the secondary control unit is correctly supplied. In this way, each secondary control unit is able to function independently, and is not affected by any anomaly of another clock or of another electrical energy source of another secondary control unit or of the main control unit, for example.

The architecture may also comprise an electrical energy source and a clock which are dedicated to the main control unit. A module for the management of the power on reset function may also be dedicated to the main control unit. In this way, the main control unit is able to function independently, in a similar manner to that described above.

Each processing unit of a secondary control unit and the main control unit may be connected by means of a link which is configured to permit the following:
  the transmission by the main control unit to each processing unit of data for the control, in a normal operating mode, of the switching cells of the respective H-bridge, and
  the transmission by the main control unit to each processing unit of data for the control, in an auxiliary operating mode, of the switching cells of the respective H-bridge.

Data transmitted via this link may directly be cyclic ratio values generated by the main control unit. As a variant, said data transmitted via this link permit the processing unit to generate cyclic ratio values which will then be applied by the monitoring unit to the controllable switching cells of the respective H-bridge.

The processing by the processing unit of data transmitted via this link permits the detection of an anomaly affecting the main control unit, for example an anomaly affecting the electric power supply of said main control unit, or an anomaly affecting the main control unit itself.

Each secondary control unit may incorporate a link which is configured to permit communication between the processing unit and the monitoring unit of said secondary control unit. Accordingly, the setpoint values to be applied for the control of the switching cells of each H-bridge may be routed via this link from the processing unit to the monitoring unit, in order to modify the state of all or some of the switching cells of the respective H-bridge. A signal for the interruption of the electric power supply to the monitoring unit may also be routed to the monitoring unit via this link.

Each monitoring unit and the main control unit may be connected by means of a link which is configured to permit the transmission by each monitoring unit to the main control unit of representative values of the control applied by said monitoring, unit to all or some of the switching cells of the respective H-bridge. By means of this link, the main control unit is able to monitor the control applied by each secondary control unit, and to detect an anomaly affecting one or more secondary control units.

These representative values may or may not be the cyclic ratio values applied by the monitoring unit to the switching cells of the respective H-bridge.

The architecture may incorporate a device for the acquisition of at least one electrical or thermal variable in the d.c./a.c. voltage converter. This variable may be, for example, the voltage at the d.c. interface of the d.c./a.c. voltage converter, or each current flowing in an arm of the d.c./a.c. voltage converter. As a variant, or in combination, this variable may be the temperature measured at the center of each H-bridge.

Where the d.c./a.c. voltage converter is electrically connected to an electrical stator or rotor winding of an electric machine, the acquisition device may also execute measurements of at least one mechanical variable associated with the electric machine, for example the rotor speed of the machine or the torque applied to the rotor.

In this case, the architecture may incorporate a link which permits the transmission by the acquisition device of measurements of said variable(s) to the main control unit.

The main control unit may process these measurements and use them to generate the control which is to be applied by the secondary control units to all or some of the switching cells of their respective H-bridge. As a variant, the main control unit may transmit these measurements to the remote control unit, which generates said control and transmits the latter to the main control unit.

Hereinafter, the term "low-voltage" designates voltages equal to or lower than 12 V, and the term "high-voltage" designates voltages equal to or greater than 60 V.

The architecture may incorporate the remote control unit. In this case, the remote control unit is preferably situated in a low-voltage environment, whereas the main control unit and the secondary control units are preferably situated in a high-voltage environment, these two environments being separated by the potential barrier. The latter is achieved, for example, by means of galvanic isolation, for example via a transformer or one or more optical couplers.

As already explained above, an anomaly in the high-voltage environment which would affect the main control unit or any of the secondary control units will not prevent the application of an auxiliary control to all or some of the H-bridges.

In its communications with the remote control unit, the main control unit is preferably the master unit, in which case the remote control unit is the slave unit. Within the meaning of the present application, "the main control unit is the master unit" means that the latter is responsible for initiating communications with the remote control unit via the link which traverses the potential barrier.

As communications between the main control unit and the remote control unit are completed on the initiative of the main control unit, in the event of failure or an anomaly of the remote control unit or of any other component in the low-voltage environment, the main control unit and the secondary control units may continue to function and to control the switching cells of the d.c./a.c. voltage converter by the application of an auxiliary operating mode which does not require interaction with the remote control unit.

An architecture may therefore be provided which permits the continuation of the control of switching cells in the H-bridges, notwithstanding the occurrence of anomalies in the high-voltage and low-voltage environment.

The link permitting communication between the remote control unit and the main control unit may be a full-duplex synchronous serial link. This may be a link of the serial peripheral interface (SPI) type.

Each switching cell may be configured using a bidirectional current switch, for example a field-effect transistor or a transistor of the IGBT type with an anti-parallel diode. As a variant, bipolar transistors may be used.

According to one mode of embodiment of the invention, the architecture may be configured to allow the control of the d.c./a.c. voltage converter only. The latter may form part of an electric circuit which comprises an electrical energy storage unit and an electrical stator or rotor winding of an electric machine. This electric circuit may be devoid of any d.c./d.c. voltage converter interposed between the electrical energy storage unit and the d.c./a.c. voltage converter, in which case the d.c. interface of the d.c./a.c. voltage converter may be connected to the terminals of the electrical energy storage unit.

As a variant, according to a further mode of embodiment of the invention, the architecture may also be configured to control a d.c./d.c. voltage converter which is electrically connected to the d.c./a.c. voltage converter. A d.c./d.c. voltage converter of this type permits the adjustment of the voltage value at the d.c. interface of the d.c./a.c. voltage converter to the voltage value at the terminals of the electrical energy storage unit.

The d.c./d.c. voltage converter may comprise a number of interlinked branches, wherein each branch comprises:
  an arm extending between two terminals for the definition of the low-voltage interface and comprising two controllable switching cells, arranged in series and separated by a mid-point,
  a coil, one end of which is connected to the mid-point of the branch and the other end of which is connected to the positive terminal of the high-voltage interface,
wherein the number of branches is even and the branches are paired, the coil on one branch of a pair being magnetically coupled to the coil on the other branch of said pair,
and wherein the architecture, for each pair of branches, incorporates a monitoring unit which is configured to modify the state of all or some of said controllable switching cells of said pair of branches.

This configuration of the d.c./d.c. voltage converter with a number of interlinked branches permits the more effective distribution of power between the different branches, thereby extending the service life of the switching cells of said converter.

The switching cells of the d.c./d.c. converter may or may not be obtained using bidirectional current switches. These switching cells are, for example, structurally identical to those of the d.c./a.c. voltage converter.

In addition to communication with the secondary control units for the control of the H-bridges of the d.c./a.c. voltage converter, the main control unit may also be configured for communication with each monitoring unit associated with a pair of respective branches for the control of the d.c./d.c. voltage converter.

As a variant, a second main control unit, for example configured similarly to the other main control unit, may be provided for the dedicated control of the d.c./d.c. voltage converter. This second main control unit may be configured to communicate with the remote control unit via another potential barrier, for example another full-duplex synchronous serial link, such as a link of the SPI® type.

This second main control unit may then communicate with each monitoring unit associated with a pair of branches, in order to control the d.c./d.c. voltage converter.

In another of its aspects, the object of the invention is also an assembly of the following:
the architecture defined above, and
the d.c./a.c. voltage converter, the control of which is executed by the architecture.

The d.c./a.c. voltage converter may form part of an electric circuit comprising an electrical energy storage unit and an electrical stator winding of an electric machine. The electric machine is, for example, a synchronous motor, specifically of the permanent magnet type.

The electrical stator winding may be of the multi-phase type, specifically of the three-phase type. Each phase of the electrical stator winding may extend between the two mid-points of an H-bridge of the d.c./a.c. voltage converter, as disclosed for example in application no. WO 2010/057893, the contents of which are incorporated into the present application.

The d.c./a.c. voltage converter permits the conversion of the voltage at the terminals of the electrical energy storage unit into an a.c. voltage for the supply of the electrical stator winding.

In this assembly, an anomaly affecting the control of one phase of the electrical stator winding of the electric machine, i.e. an anomaly affecting the H-bridge dedicated to said phase or the secondary control unit dedicated to said respective H-bridge, will not prevent the continuing propulsion of the vehicle by the motor, or the continuation of the charging of the electrical energy storage unit, where this charging operation re-employs the electrical stator winding of the electric machine.

Where applicable, a d.c./d.c. voltage converter may be interposed between the electrical energy storage unit and the d.c./a.c. voltage converter.

The electric circuit may incorporate a supply line which is designed for connection, via a connector, to an external electric power grid, said supply line comprising a number of conductors which is equal to the number of phases of the electrical stator winding and each conductor being connected, at one end, to an intermediate point of one phase of the electrical stator winding. The intermediate point of said phase may be a mid-point.

The electric power grid may be an industrial electric power grid managed by an operator. For example, this may be an electric power grid supplying a voltage at a frequency of 50 Hz or 60 Hz.

This may be a single-phase grid supplying a voltage between 120 V and 240 V, or a multi-phase grid, for example a three-phase grid, specifically a three-phase grid supplying a voltage between 208 V and 416 V.

According to another of its aspects, another object of the invention is a control process for a d.c./a.c. voltage converter using an architecture of the type defined above, in which:
in a normal operating mode, each secondary control unit, via its monitoring unit, applies setpoint values to all or some of the switching cells of the respective H-bridge, said setpoint values being generated on the basis of information routed to the processing unit from the remote control unit and/or from the main control unit, and
in an auxiliary operating mode, all or some of the secondary control units, via their monitoring unit, apply setpoint values to all or some of the switching cells of their respective H-bridge, such that the two mid-points of said H-bridge are short-circuited.

The architecture interacts, for example, with the above-mentioned electric circuit comprising an electrical stator winding, each phase of which extends between the two mid-points of an H-bridge.

The auxiliary control may then permit the short-circuiting of each phase of the electrical stator winding, or at least of the majority of said phases. Where the electrical stator winding is of the three-phase type, at least two phases of said winding may be short-circuited by the application of the auxiliary control.

This auxiliary control may be applied in the event of an anomaly affecting the architecture or in the circuit, thereby preventing the racing of the motor or the spurious braking of the electric machine, together with an excessively high increase in the electromotive forces generated in the phases of the electrical stator winding.

The transition from the normal operating mode to the auxiliary operating mode may be executed upon the detection of an anomaly affecting the main control unit and/or the remote control unit, whereby each secondary control unit will then impose setpoint values upon all or some of the switching cells of the respective H-bridge which will permit the short-circuiting of the two mid-points of said H-bridge. In this case, each phase of the electrical stator winding may be short-circuited in order to prevent the above-mentioned hazards.

As a variant, the transition from the normal operating mode to the auxiliary operating mode may be executed upon the detection of an anomaly affecting at least one secondary control unit, whereby the main control unit then imposes upon at least the remaining secondary control units, via their monitoring unit, the application of setpoint values to all or some of the switching cells of their respective H-bridge, such that the two mid-points of said H-bridge are short-circuited.

In this way, it can be ensured that all the secondary control units, other than that affected by the anomaly, will apply the auxiliary control, such that each phase of the electrical winding associated with one of said remaining secondary control units will be short-circuited. Where applicable, and depending upon the extent of the anomaly affecting it, the secondary control unit affected by the anomaly may also apply the auxiliary control.

In this way, as many phases of the electrical stator winding as possible may be short-circuited in order to eliminate the above-mentioned hazards. In the worst case, each phase of the electrical stator winding associated with a secondary control unit which is not affected by the anomaly will be short-circuited. In the best case, each phase of the electrical stator winding is short-circuited.

Throughout the above, the auxiliary control mode may be generic, the same setpoints being applied immediately an anomaly is detected in the architecture or in the circuit, regardless of the nature of said anomaly.

As a variant, the auxiliary control mode may be adapted to the anomaly detected, i.e. the setpoints applied may vary according to the nature of the anomaly detected and/or the number thereof.

Understanding of the invention will be clarified by reading the following description of examples of the embodiment thereof, which are not provided by way of limitation, and by the examination of the attached drawings, in which.

Figure 1:
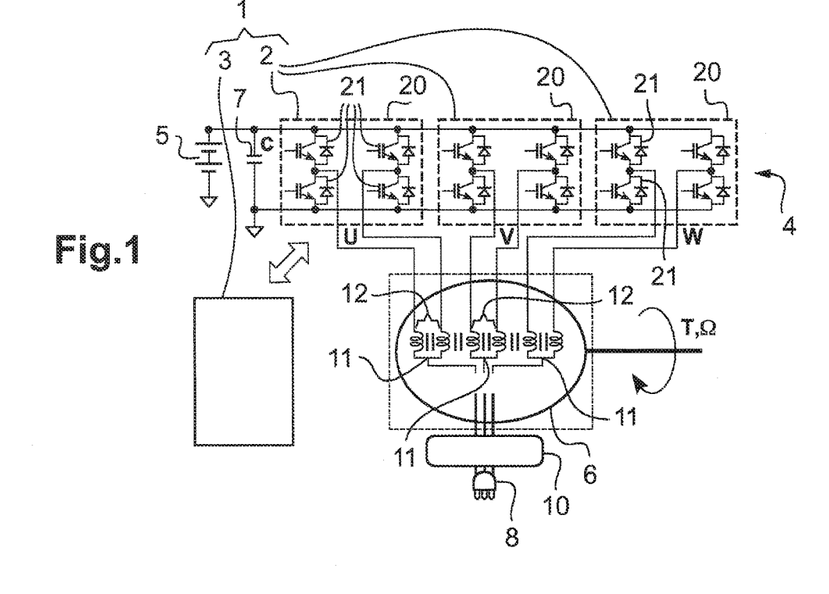
FIG. 1 shows a schematic representation of an assembly according to a first example of embodiment of the invention, comprising a d.c./a.c. voltage converter and the electronic architecture for the control of the latter.

FIG. 1 represents an assembly 1 according to a first example of embodiment of the invention. Said assembly 1 comprises a d.c./a.c. voltage converter 2 and an electronic architecture 3 for the control of said converter 2.

In the example shown in FIG. 1, the d.c./a.c. voltage converter 2 forms part of an electric circuit 4 which also comprises the following:

an electrical energy storage unit 5, and
an electrical stator winding 6 of an electric machine.

In this example, the d.c./a.c. voltage converter 2 is arranged between the electrical energy storage unit 5 and the electrical winding 6, in order to permit an exchange of electrical energy between the latter.

In the example considered, the electric machine is used to drive a hybrid or electric vehicle. The electric machine may be, for example, a permanent-magnet synchronous motor. The electric machine may have, for example, a power rating between 10 W and 10 MW, and specifically between 100 W and 200 kW. In this example, the electrical stator winding 6 is of the three-phase type.

The electrical energy storage unit 5 may be a battery, a super-capacitor or any combination of batteries or super-capacitors. It may comprise, for example, a number of parallel branches of batteries connected in series. The electrical energy storage unit 5 may have a voltage rating between 60 V and 800 V, specifically between 200 V and 450 V, or between 600 V and 800 V.

A capacitor 7 may be arranged in parallel with the electrical energy storage unit 5.

As represented in FIG. 1, the electric circuit 4 may incorporate a connector 8 which is designed for connection to an industrial electric power grid delivering a voltage at 50 Hz or 60 Hz.

This connector 8 is connected, for example, via a filter 10 for the elimination of electromagnetic interference, to an intermediate point 11 of each phase 12 of the electrical stator winding 6. This may be, for example, a mid-point 11 of the phases, as disclosed in application no. WO 2010/057893.

In this example, the converter 2 converts the d.c. voltage at the terminals of the electrical energy storage unit 5 into a three-phase a.c. voltage for the supply of the electrical stator winding 6, in order to permit the propulsion of the vehicle.

Conversely, the converter 2 may convert the a.c. voltage supplied by the power grid and flowing via the electrical stator winding 6 into a d.c. voltage for the supply of the electrical energy storage unit 5, in order to permit the charging of the latter. In this case, the connector 8 is connected to a terminal of the electric power grid.

Here, the converter 2 comprises three H-bridges 20, whereby each H-bridge is formed of two arms arranged in parallel between the terminals of the electrical energy storage unit 5. In the present example, each arm is provided with two controllable switching cells 21, which are reversible and arranged in series. A switching cell 21 is formed, for example, by the anti-parallel arrangement of a transistor and a diode, wherein the latter, where applicable, is the intrinsic diode of the transistor. The transistor may be of the field-effect type, the IGBT type, or the bipolar type.

In the example shown in FIG. 1, the circuit 4 is devoid of a d.c./d.c. voltage converter interposed between the electrical energy storage unit 5 and the d.c./a.c. voltage converter 2.

The switching cells 21 are controlled by the architecture 3, as described hereinafter.

Figure 2:
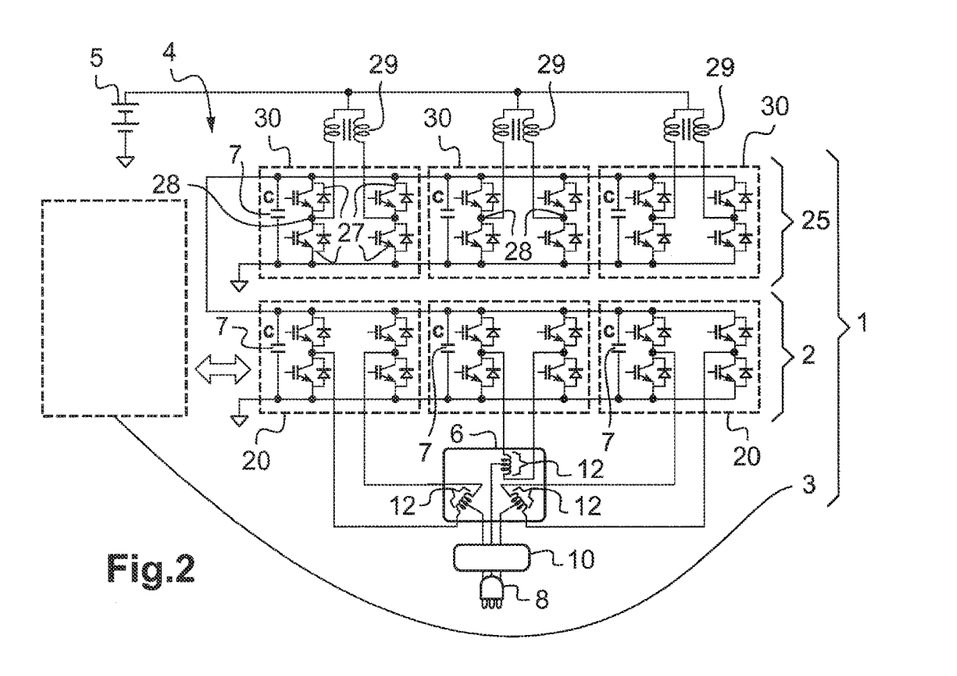
FIG. 2 shows a schematic representation of an assembly according to a second example of embodiment of the invention, comprising a d.c./a.c. voltage converter, a d.c./d.c. voltage converter and the electronic architecture for the control of the latter.

FIG. 2 shows an assembly 1 according to a second example of embodiment of the invention. This assembly 1 differs from that described above with reference to FIG. 1, in that the electric circuit 4 also incorporates a d.c./d.c. voltage converter 25 interposed between the capacitor 7 and the electrical energy storage unit 5, i.e. the converter 25 is also arranged between said unit 5 and the d.c./a.c. voltage converter 2.

The d.c./d.c. voltage converter 25 permits the adjustment of the voltage value at the terminals of the electrical energy storage unit 5 to the voltage value which is appropriate for the supply of the electrical stator winding 6, and vice versa. In this case, said converter 25 is interlinked, comprising a number of branches. In the present example, each branch comprises:

an arm arranged in parallel with the capacitor 7 and comprising two switching cells 27 in series, which are controllable and separated by a mid-point 28;
a coil 29, one end of which is connected to the mid-point 28 of the arm, and the other end of which is connected to the positive high-voltage terminal of the electrical energy storage unit 5.

In the example considered, the number of branches in the converter 25 is equal to the number of arms of the converter 2, namely six, and the branches are paired, the coil 29 of one branch in a pair 30 being magnetically coupled to the coil 29 of the other branch of said pair 30.

In this example, the switching cells 21 of the d.c./a.c. voltage converter 2, and the switching cells 27 of the d.c./d.c. voltage converter 25 are controlled by the architecture 3.

Figure 3:
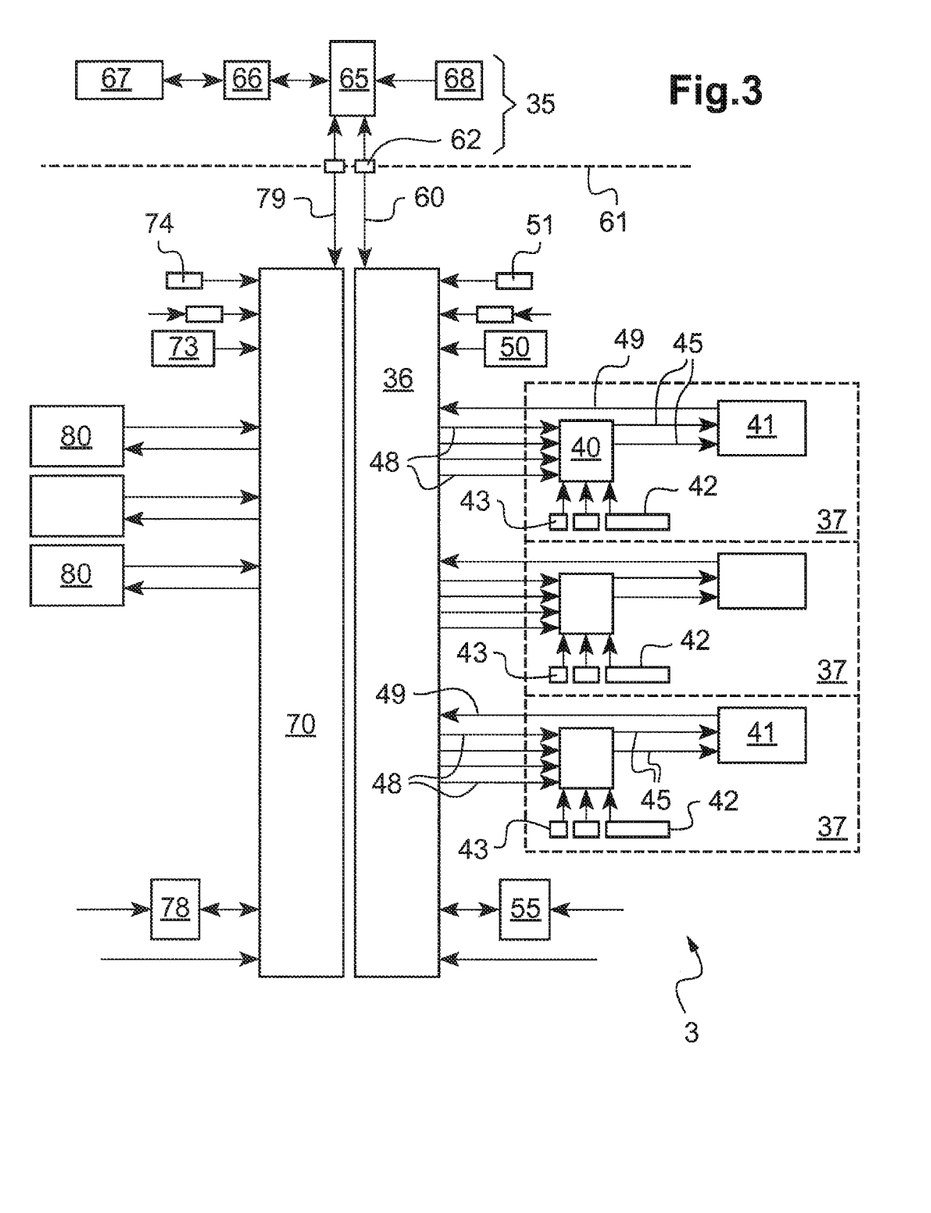
FIG. 3 shows a detailed representation of the electronic architecture of the assembly represented in FIG. 2.

We will now describe the architecture 3 shown in FIG. 2, with reference to FIG. 3. In this example, which is not provided by way of limitation, said architecture 3 is designed to control the d.c./a.c. voltage converter 2 and the d.c./d.c. voltage converter 25.

The control of the d.c./a.c. voltage converter 2 involves the deployment of a remote control unit 35, a main control unit 36 and a plurality of secondary control units 37. Each of the secondary control units 37 is dedicated to an H-bridge 20 of the converter 3 and, in the present example, comprises the following:

a processing unit 40 for the processing of information received from the main control unit 36, and
a monitoring unit 41 for the monitoring of the switching cells 21 of the bridge 20 to which it is dedicated.

Said monitoring unit permits the modification of the state of all or some of the switching cells 21, on the basis of information received from the processing unit 40. Said monitoring unit 41 is commonly described as a "driver".

As will be observed from FIG. 3, in the present example, each secondary control unit 37 incorporates its own electrical energy source 42 for the supply of electric power to the various components of the secondary control unit 37 and/or to the switching cells 21 of the H-bridge 20.

In the present example, each secondary control unit 37 also incorporates its own clock 43, together with a module for the management of the power on reset function.

In the present example, each secondary control unit 37 also incorporates a link 45 for the exchange of information between the processing unit 40 and the monitoring unit 41. This information permits, for example, the control of the switching cells 21 of the H-bridge 20, specifically comprising control signals and electric power supply signals for the changing of the state of all or some of said switching cells 21.

As represented in FIG. 3, each processing unit 40 of a secondary control unit 37 may be connected by means of a link 48 to the main control unit 36. This link 48 permits the following:
- the transmission by the main control unit 36 to each processing unit 40 of data for the control, in a normal operating mode, of the switching cells 21 of the respective H-bridge 20, and
- the transmission by the main control unit 36 to each processing unit 40 of data for the control, in an auxiliary operating mode, of the switching cells 21 of the respective H-bridge 20.

Each monitoring unit 41 may also be directly connected to the main control unit 36 by means of a link 49, with no passage through the processing unit 40. This link 49 permits the transmission by each monitoring unit 41 of the cyclic ratio values which it applies to the switching cells 21 of the H-bridge 20 to which it is dedicated.

The fact that said link 49 bypasses the processing unit 40 ensures that an anomaly affecting the processing unit 40 associated with a monitoring unit 41 in a secondary control unit 37 will not prevent the transmission of said cyclic ratio values to the main control unit.

The architecture 3 also incorporates a clock 50, an electrical energy source 51 and a module for the management of the power on reset function, which are dedicated to the main control unit 36.

As represented, the architecture 3 may also incorporate an acquisition device 55 for acquiring measurements in the electric circuit 4. This acquisition device permits, for example, the acquisition of at least one of the following:
- the current flowing in each arm of the d.c./a.c. voltage converter 2,
- the voltage at the terminals of the capacitor 7, i.e. on the d.c. interface of the converter 2,
- the temperature at the mid-point of each H-bridge 20,
- the speed of rotation of the rotor of the electric machine, and
- the torque applied to said rotor.

These measurements may be delivered in analog form to an analog/digital converter, and thereafter via a link 58 to the main control unit 36. The link 58 is, for example, a full-duplex synchronous serial link, for example an SPI.

The latter may process said information itself, which information is then used to generate the control of the converter 2, for example in a control arrangement.

As a variant, the main control unit 36 may transmit said information to the remote control unit 35 to which it is connected by means of a link 60. Said link 60 is, for example, a full-duplex synchronous serial link, for example an SPI. In the example shown in FIG. 3, the exchange of data between the main control unit 36 and the remote control unit 35 is executed via a potential barrier 61 which is traversed by the link 60.

Said potential barrier 61 provides, for example, galvanic isolation 62, specifically by the deployment of a transformer or an optical coupler. Said barrier 61 separates the low-voltage environment which incorporates the remote control unit 35 from the high-voltage environment which incorporates the main control unit 36, the secondary control units 37 and the electric circuit 4.

The main control unit 36 may be the master unit in its communications with the remote control unit 35, in which case the latter is the slave unit.

The remote control unit 35 may incorporate one or more processing systems, for example one or more microcontrollers 65. Said microcontroller 65 may communicate with a monitor 67 via an ADC link 66. In a vehicular application, the monitor may be the engine control unit (ECU) of the vehicle.

In the example described, the remote control unit 35 is provided with a dedicated electrical energy source 68. The remote control unit 35 may be responsible for the generation of setpoint values for the current in each arm of the d.c./a.c. voltage converter 2, and for the voltage at the terminals of the arms of the converter 2.

Where applicable, the remote control unit 35 may be associated with measuring devices for the measurement of the temperature in the stator of the electric machine, and with measuring devices for the determination of the position of the rotor of the electric machine.

As already indicated, in the example considered, the architecture 3 is also configured for the control of the d.c./d.c. voltage converter 25. To this end, it may incorporate a second main control unit 70 configured, for example, using a component which is similar to that which forms the main control unit 36, and a plurality of monitoring units 80, each of said monitoring units 80 being dedicated to the control of the switching cells 27 in one pair 30 of branches.

The second main control unit 70 may communicate via a link 71 with each monitoring unit 80. Similarly to the arrangement described above, the second main control unit 70 may be associated with a dedicated electrical energy source 73, a dedicated clock 74, a module for the management of the power on reset function, and an acquisition device 78 for the recording of measurements associated with electrical variables in the d.c./d.c. voltage converter 25.

A link 79 which is similar to the link 60 permits communication between the second main control unit 70 and the remote control unit 35.

Where the assembly 1 is devoid of a d.c./d.c. voltage converter 25, the architecture 3 will not incorporate the elements numbered from 70 to 79.

We will now describe an example of the control of the d.c./a.c. voltage converter 2 using the electronic architecture 3. In a normal operating mode, no anomaly is detected in the architecture 3 or in the circuit 4, and each secondary control unit 37 applies, via its monitoring unit 41, setpoint values to all or some of the switching cells 21 of the respective H-bridge 20, said setpoint values being generated on the basis of information routed to the processing unit 40 from the remote control unit 35 and/or from the main control unit 36.

Measurements acquired by the acquisition device 55 are, for example, transferred to the remote control unit 35 via the main control unit 36. Setpoints are then generated by the remote control unit 35, then converted by the main control unit 36. The secondary control units 37 then retrieve the setpoints to be applied to their respective H-bridge 20, which are processed via the processing unit 40 and applied via their monitoring unit 41 to all or some of the switching cells 21 of said bridge 20.

Information transmitted via the link 49 permits the main control unit 36 to confirm that the correct setpoints are applied by each monitoring unit 41 and, accordingly, that there is no anomaly affecting the secondary control units.

Information transmitted via the link 48 also permits each secondary control unit 37 to confirm the correct operation of the main control unit 36.

Where an anomaly is detected in the architecture 3 or in the electric circuit 4, a control may be applied in accordance with an auxiliary operating mode. According to this auxiliary operating mode, all or some of the secondary control units 37 apply, via their monitoring unit 41, setpoint values to all or some of the switching cells 21 of their respective H-bridge 20, such that the two mid-points of said H-bridge 20 are short-circuited. This prevents, for example, the spurious braking of the vehicle or a deterioration in the electric circuit.

More specifically, the transition from the normal operating mode to the auxiliary operating mode may be executed where at least one of the secondary control units 37 detects an anomaly affecting the main control unit 36. Each secondary control unit 37 may then impose upon all or some of the switching cells 21 of the respective H-bridge 20 setpoint values which will permit the short-circuiting of the two mid-points of said H-bridge 20. This auxiliary control is therefore intended to close all the switching cells arranged "up-circuit" of each H-bridge, or to close all the switching cells arranged "down-circuit" of each H-bridge. This therefore results in the short-circuiting of each phase 12 of the electrical stator winding 6.

As a variant, the transition from the normal operating mode to the auxiliary operating mode may be executed upon the detection by the main control unit 36, specifically by the observation of data transmitted via the link 49, of an anomaly affecting at least one secondary control unit 37. The main control unit 36 may then impose upon all the secondary control units 37, via their monitoring unit 41, the application of setpoint values to all or some of the switching cells 21 of their respective H-bridge 20, such that the two mid-points of said H-bridge 20 are short-circuited.

Where the anomaly affecting the secondary control unit 37 permits the application by the latter of this control, the latter, together with all the remaining secondary control units will then control their dedicated H-bridge such that each phase 12 of the electrical stator winding 6 is short-circuited.

Where the anomaly affecting the secondary control unit 37 is such that it can no longer apply the controls transmitted by the main control unit 36, only those secondary control units 37 which are operating normally will apply this control, thereby ensuring that the phase of the electrical stator winding with which each of the latter is associated will be short-circuited.

Where the electrical stator winding 6 is of the three-phase type, the invention ensures that at least two of the phases 12 of said winding 6 will be short-circuited.

The invention therefore permits the deployment of the process disclosed in the application filed in France by the Applicant on 11 Apr. 2012, under no. 1253337.

The invention therefore permits a transition to an auxiliary operating mode in the event of an anomaly in the low-voltage environment, on the grounds that the main control unit 36 in the master unit in its communications with the remote control unit 35, and in the event of an anomaly in the high-voltage environment, as described above.

The invention is not limited to the examples described above.

The expression "comprising a" is to be understood as signifying "comprising at least one", unless specified otherwise.

The invention claimed is:

1. An electronic architecture for the control of a d.c./a.c. voltage converter, said converter comprising a plurality of arms mounted in parallel, each arm comprising two controllable switching cells, in series and separated by a mid-point, the arms being paired in H-bridges, said architecture comprising:
   a main control unit, configured to communicate through a potential barrier with a remote control unit; and
   a plurality of secondary control units, wherein each secondary control unit is dedicated to the control of a respective H-bridge, and comprises:
      a processing unit for the processing of information received from the main control unit, and
      a monitoring unit for the monitoring of the controllable switching cells of said H-bridge, wherein said monitoring unit is configured to modify the state of all or some of said switching cells of said H-bridge, at least on the basis of information received from the corresponding processing unit,
   wherein the plurality of secondary control units are physically separate from each other, and also separate from the main control unit.

2. The architecture as claimed in claim 1, wherein the main control unit is configured for the transmission to each secondary control unit of information originating from the remote control unit.

3. The architecture as claimed in claim 1, wherein the remote control unit, the main control unit and the processing units of the secondary control units comprise intergrated circuits.

4. The architecture as claimed in claim 3, wherein the remote control unit comprises at least one microcontroller, the main control unit is a first programmable logic circuit, and the processing units of the secondary control units are second programmable logic circuits.

5. The architecture as claimed in claim 1, wherein each secondary control unit further comprises a dedicated electrical energy source and a dedicated clock.

6. The architecture as claimed in claim 1, further comprising an electrical energy source and a clock which are dedicated to the main control unit.

7. The architecture as claimed in claim 1, wherein each processing unit of a secondary control unit and the main control unit are connected by a link which is configured to permit the following:
   the transmission by the main control unit to each processing unit of data for the control, in a normal operating mode, of the switching cells of the respective H-bridge, and
   the transmission by the main control unit to each processing unit of data for the control, in an auxiliary operating mode, of the switching cells of the respective H-bridge.

8. The architecture as claimed in claim 7, wherein each secondary control unit incorporates a link which is configured to permit communication between the processing unit and the monitoring unit of said secondary control unit.

9. The architecture as claimed in claim 1, wherein each monitoring unit and the main control unit are connected by a link which is configured to permit the transmission by each monitoring unit to the main control unit of representative values of the control applied by said monitoring unit to all or some of the switching cells of the respective H-bridge.

10. The architecture as claimed in claim 1, incorporating a device for the acquisition of at least one electrical or thermal variable in the d.c./a.c. voltage converter.

11. The architecture as claimed in claim 10, incorporating a link which permits the transmission by the acquisition device of measurements of said variable(s) to the main control unit.

12. The architecture as claimed in claim 1, further configured to control a d.c./d.c. voltage converter which is electrically connected to the d.c./a.c. voltage converter.

13. The architecture as claimed in claim 12, wherein said d.c./d.c. voltage converter comprises a number of interlinked branches, wherein each branch comprises:
- an arm extending between two terminals for the definition of the low-voltage interface and comprising two controllable switching cells, arranged in series and separated by a mid-point,
- a coil, one end of which is connected to the mid-point of the branch and the other end of which is connected to the positive terminal of the high-voltage interface,
- wherein the number of branches is even and the branches are paired, the coil on one branch of a pair being magnetically coupled to the coil on the other branch of said pair,
- and wherein the architecture, for each pair of branches, incorporates a monitoring unit which is configured to modify the state of all or some of said controllable switching cells of said pair of branches.

14. A control process for a d.c./a.c. voltage converter using an architecture as claimed in claim 1, in which:
- in a normal operating mode, each secondary control unit, via its monitoring unit, applies setpoint values to all or some of the switching cells of the respective H-bridge, said setpoint values being generated on the basis of information routed to the processing unit from the remote control unit and/or from the main control unit, and
- in an auxiliary operating mode, all or some of the secondary control units, via their monitoring unit, apply setpoint values to all or some of the switching cells of their respective H-bridge, such that the two mid-points of said H-bridge are short-circuited.

15. The process as claimed in claim 14, wherein the transition from the normal operating mode to the auxiliary operating mode is executed upon the detection of an anomaly affecting the main control unit, whereby each secondary control unit will then impose setpoint values upon all or some of the switching cells of the respective H-bridge which will permit the short-circuiting of the two mid-points of said H-bridge.

16. The process as claimed in claim 14, wherein the transition from the normal operating mode to the auxiliary operating mode is executed upon the detection of an anomaly affecting at least one secondary control unit, whereby the main control unit then imposes upon at least the remaining secondary control units, via their monitoring unit, the application of setpoint values to all or some of the switching cells of their respective H-bridge, such that the two mid-points of said H-bridge are short-circuited.

* * * * *